Jan. 11, 1944.   L. M. LOCKHART   2,338,816
MUSICAL INSTRUCTION DEVICE
Filed Sept. 13, 1943
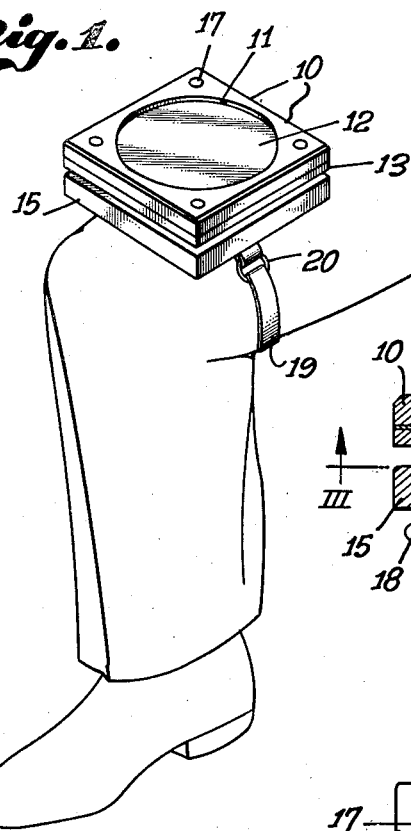
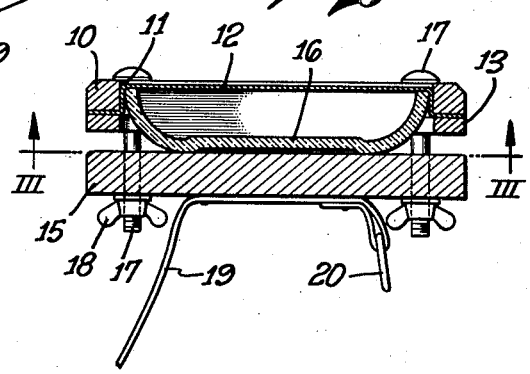
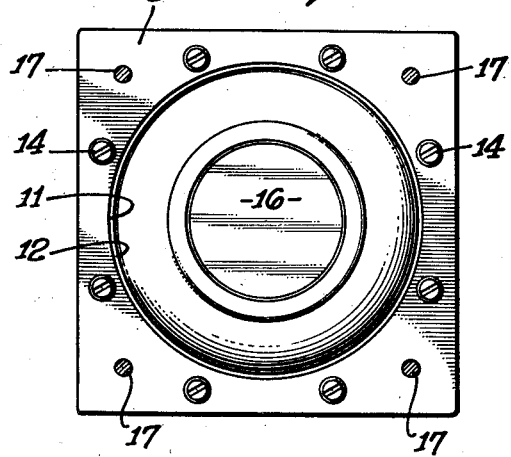
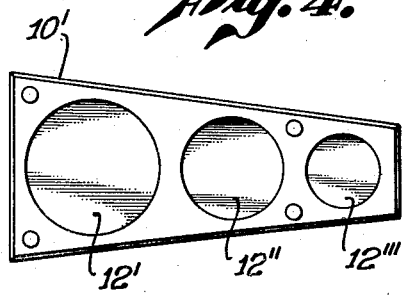
LEE M. LOCKHART,
INVENTOR.
BY [signature]
ATTORNEY.

Patented Jan. 11, 1944

2,338,816

UNITED STATES PATENT OFFICE 2,338,816

MUSICAL INSTRUCTION DEVICE

Lee M. Lockhart, Los Angeles, Calif.

Application September 13, 1943, Serial No. 502,108

3 Claims. (Cl. 84—411)

This invention pertains to devices particularly adapted for use by students of percussion-type instruments. Under some circumstances, the device may be employed in orchestras, bands, etc.

Students of percussion-type instruments are somewhat at a disadvantage in that practice on kettledrums, bass drums, snare-drums, etc., sometimes becomes annoying to persons in the immediate vicinity. The device of the present invention permits the student to practice and become adept without the necessity of using a full size instrument.

Generally stated, the device of the present invention consists of a base member, an apertured top member carrying a tympanum, and a supporting element carried by the base and provided with a circular, upstanding edge adapted to fit into the aperture and contact the tympanum. Means are provided for connecting the base and top members and for tensioning the tympanum. An adjustable strap is carried by the lower surface of the base member so that the entire device may be strapped to the leg or thigh of the student and thereby occupy a position very similar to that of the snare-drums, for example. The student may then practice and attain substantially the same benefits from such practice as if a full size instrument had been employed.

An object of the present invention, therefore, is to disclose and provide a practice device for students of percussion-type instruments.

A further object is to disclose and provide a simple, inexpensive, adjustable percussion device.

Further objects, uses, and advantages of the invention will become apparent to those skilled in the art from the following detailed description of an exemplary form in which the present invention is embodied.

In order to facilitate understanding, reference will be had to the appended drawing, in which:

Fig. 1 is a perspective view of the device in position upon the knee of a student.

Fig. 2 is a transverse section through the device.

Fig. 3 is a lateral section taken along the plane III—III of Fig. 2.

Fig. 4 is a plan view of a modified form of device.

In the particular form of device shown in the appended drawing, an upper member 10 is shown provided with a circular aperture 11. This top member 10 includes means for carrying a drum skin or tympanum 12 across the aperture 11. Such means may comprise a ring or an apertured member 13 adapted to grasp the edges of the tympanum 12, the ring being connected to the upper member 10 by means of screws 14 or the like so that the edges of the drum skin are firmly clasped between the member 10 and ring 13.

The device also includes a substantially solid, flat base member 15 adapted to carry a supporting element. The supporting element illustrated in the drawing comprises a concave dish-shaped member 16 having a circular, upstanding edge adapted to fit into the aperture 11 and contact the tympanum 12.

Means are provided for connecting the base and top members. Preferably such means should be capable of adjustable tension. In the drawing, bolts 17 are shown extending through suitable bores in the upper and lower members 10 and 15, such bolts being tightened by means of the wing nuts 18. When the wing nuts 18 are tightened, the supporting element 16 is forced against the lower surface of the tympanum 12, thereby tensioning the same.

The base or bottom member 15 carries on its lower surface an adjustable strap 19 having the buckle 20. This strap may be attached to the bottom 15 in any suitable manner.

It will be noticed that the entire device may be strapped to the leg or any desired object so as to hold the upper surface of the tympanum 12 in the position normally assumed by the percussion instrument, which the student is learning to play, thereby permitting such student to develop the dexterity and technique required.

Fig. 4 illustrates a modified form of device in which the upper member 10' is provided with a plurality of apertures differing in diameter or size, so that different tonal effects may be obtained by striking the different areas 12', 12", etc. This form of device is not only of value to students of the kettle-drums, but may also be employed as a musical instrument with bands, orchestras and the like.

The top and bottom members 10 and 15 may be made of any suitable material. Although the spacing element 16 may also be made of various materials, it has been found that ceramic supporting elements such as those made of glass, are eminently suited for the purpose of this invention. By the use of a glass supporting element 16, an increased resonance and tone is attained.

All changes and modifications coming within the scope of the appended claims are embraced thereby.

I claim:

1. A practice device for students of percussion-type instruments, comprising: a base member, an apertured top member, a tympanum carried by the top member and extending over the aperture thereof, a supporting member carried by the base member and provided with a circular upstanding edge adapted to extend into the aperture and contact said tympanum, adjustable tension means extending through said top and bottom members for holding said top and bottom members, and adjustable strap means attached to the bottom of the base member.

2. In a device of the character described, the combination of: a substantially flat base member, a top member provided with an aperture, said top member including means for holding a drum skin across the aperture, a dish-shaped ceramic supporting element carried by the base member and provided with an upstanding edge adapted to fit said aperture, adjustable tension means connecting said base and top member whereby the upstanding edge of the supporting element may be pressed against the lower surface of the drum skin; and an adjustable strap attached to the bottom of the base member.

3. In a device of the character described, the combination of: a substantially flat base member, a top member provided with an aperture, said top member including means for firmly holding a drum skin across the aperture, a supporting member carried by the base member and provided with a circular upstanding edge adapted to extend into the aperture and contact the drum skin, and adjustable tension means extending through said top and base member whereby the upstanding edge of the supporting member may be pressed against the lower surface of the drum skin to tension the same.

LEE M. LOCKHART.